US011887518B2

(12) United States Patent
Nakamura

(10) Patent No.: US 11,887,518 B2
(45) Date of Patent: Jan. 30, 2024

(54) DISPLAY DEVICE HAVING DISPLAYABLE AREA EXPANSION UNIT AND CUTTING UNIT AND CONTROL METHOD THEREOF

(71) Applicant: SHARP KABUSHIKI KAISHA, Saikai (JP)

(72) Inventor: Tatsunori Nakamura, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 18/090,403

(22) Filed: Dec. 28, 2022

(65) Prior Publication Data

US 2023/0215310 A1 Jul. 6, 2023

Related U.S. Application Data

(60) Provisional application No. 63/296,990, filed on Jan. 6, 2022.

(51) Int. Cl.
*G09G 3/00* (2006.01)
*G09G 3/36* (2006.01)

(52) U.S. Cl.
CPC ........... *G09G 3/007* (2013.01); *G09G 3/3666* (2013.01); *G09G 2320/0626* (2013.01)

(58) Field of Classification Search
CPC ................. G09G 3/007; G09G 3/3666; G09G 2320/0626; G09G 3/3426; G09G 3/3611; G09G 3/3648; G09G 3/3413; G09G 3/342; G09G 3/003; G09G 3/3607; G09G 5/028; H04N 13/341; G02F 1/13471; G02F 1/1347; G02B 5/3025
See application file for complete search history.

(56) References Cited

U.S. PATENT DOCUMENTS

| | | | | | |
|---|---|---|---|---|---|
| 2009/0147186 | A1* | 6/2009 | Nakai | G02F 1/13471 | 345/89 |
| 2010/0118006 | A1* | 5/2010 | Kimura | G09G 3/3611 | 348/673 |
| 2010/0238189 | A1* | 9/2010 | Feng | G09G 3/3426 | 345/589 |
| 2011/0037785 | A1* | 2/2011 | Shiomi | G09G 3/3426 | 345/102 |
| 2011/0164194 | A1* | 7/2011 | Robinson | H04N 13/341 | 349/15 |
| 2016/0042701 | A1* | 2/2016 | Furumoto | G02F 1/1347 | 345/694 |

(Continued)

FOREIGN PATENT DOCUMENTS

| | | | | |
|---|---|---|---|---|
| JP | 2017173667 A | 9/2017 | | |
| KR | 2017113070 A | * | 10/2017 | G09G 3/007 |

*Primary Examiner* — Richard J Hong
(74) *Attorney, Agent, or Firm* — ScienBiziP, P.C.

(57) ABSTRACT

A display device includes a first liquid crystal panel, a second liquid crystal panel disposed on a back face side of the first liquid crystal panel, a position compensation unit that compensates for a display position of an image on the second liquid crystal panel based on position compensation information indicating a relative positional relationship between the first liquid crystal panel and the second liquid crystal panel, and an area expansion unit that expands a displayable area of the image before the display position is compensated for or a displayable area of the image after the display position is compensated for by the position compensation unit.

7 Claims, 13 Drawing Sheets

(56) References Cited

U.S. PATENT DOCUMENTS

| | | | | |
|---|---|---|---|---|
| 2016/0379575 | A1* | 12/2016 | Kawai | G09G 3/3611 345/694 |
| 2018/0182304 | A1* | 6/2018 | Lee | G09G 3/3607 |
| 2018/0231789 | A1* | 8/2018 | Ng | G09G 3/003 |
| 2019/0086724 | A1* | 3/2019 | Shih | G02B 5/3025 |
| 2020/0175934 | A1* | 6/2020 | Hirotsune | G09G 5/028 |
| 2020/0184908 | A1* | 6/2020 | Nishiguchi | G09G 3/342 |
| 2020/0193926 | A1* | 6/2020 | Koudo | G09G 3/3607 |
| 2020/0320938 | A1* | 10/2020 | Lee | G09G 3/3413 |
| 2021/0193061 | A1* | 6/2021 | Nakanishi | G09G 3/3607 |
| 2021/0201836 | A1* | 7/2021 | Nakanishi | G09G 3/3648 |

* cited by examiner

| | | | | | | |
|---|---|---|---|---|---|---|
| 0.0 | 0.0 | 0.0 | 0.1 | 0.0 | 0.0 | 0.0 |
| 0.0 | 0.1 | 0.5 | 0.7 | 0.5 | 0.1 | 0.0 |
| 0.0 | 0.5 | 1.0 | 1.0 | 1.0 | 0.5 | 0.0 |
| 0.1 | 0.7 | 1.0 | 1.0 | 1.0 | 0.7 | 0.1 |
| 0.0 | 0.5 | 1.0 | 1.0 | 1.0 | 0.5 | 0.0 |
| 0.0 | 0.1 | 0.5 | 0.7 | 0.5 | 0.1 | 0.0 |
| 0.0 | 0.0 | 0.0 | 0.1 | 0.0 | 0.0 | 0.0 |

FIG. 4

DISPLAY DEVICE HAVING DISPLAYABLE AREA EXPANSION UNIT AND CUTTING UNIT AND CONTROL METHOD THEREOF

CROSS-REFERENCE TO RELATED APPLICATION

The present application claims priority from Provisional Application No. 63/296,990, the content to which is hereby incorporated by reference into this application.

BACKGROUND

1. Field

The disclosure relates to a display device and a control method thereof.

2. Description of the Related Art

For example, JP 2017-173667 A discloses a display device including a position compensation unit that compensates for a display position of an image on a second liquid crystal panel based on position compensation information indicating a positional relationship between a first liquid crystal panel and the second liquid crystal panel.

According to JP 2017-173667 A, because the position compensation unit is provided, a positional shift that takes place in the step of bonding the first liquid crystal panel to the second liquid crystal panel can be compensated for in the display stage.

SUMMARY

However, in the display device disclosed in PTL 1 described above, by compensating for the display position of the image on the second liquid crystal panel, there is a problem that appropriate display will not be performed in a region on the second liquid crystal panel where there is no displayable image data.

The disclosure has been made in view of the problem described above. An object of the disclosure is to provide a display device that can appropriately display an image even when the display position of the image is compensated for.

A display device according to an aspect of the disclosure includes a first liquid crystal panel, a second liquid crystal panel disposed on a back face side of the first liquid crystal panel, a position compensation unit that compensates for a display position of an image on the second liquid crystal panel based on position compensation information indicating a relative positional relationship between the first liquid crystal panel and the second liquid crystal panel, and an area expansion unit that expands a displayable area of the image before the display position is compensated for or a displayable area of the image after the display position is compensated for by the position compensation unit.

A control method of a display device according to an aspect of the disclosure is a control method of a display device including a first liquid crystal panel and a second liquid crystal panel disposed on a back face side of the first liquid crystal panel, the control method including compensating for a display position of an image on the second liquid crystal panel based on position compensation information indicating a relative positional relationship between the first liquid crystal panel and the second liquid crystal panel, and expanding a displayable area of the image before the display position is compensated for or a displayable area of the image after the display position is compensated for in the compensating for the display position of the image.

BRIEF DESCRIPTION OF DRAWINGS

FIG. 4 is a table showing an example of filter coefficients of a filter used by a filter processing unit included in the image processing unit illustrated in FIG. 3.

DETAILED DESCRIPTION

Figure 1:
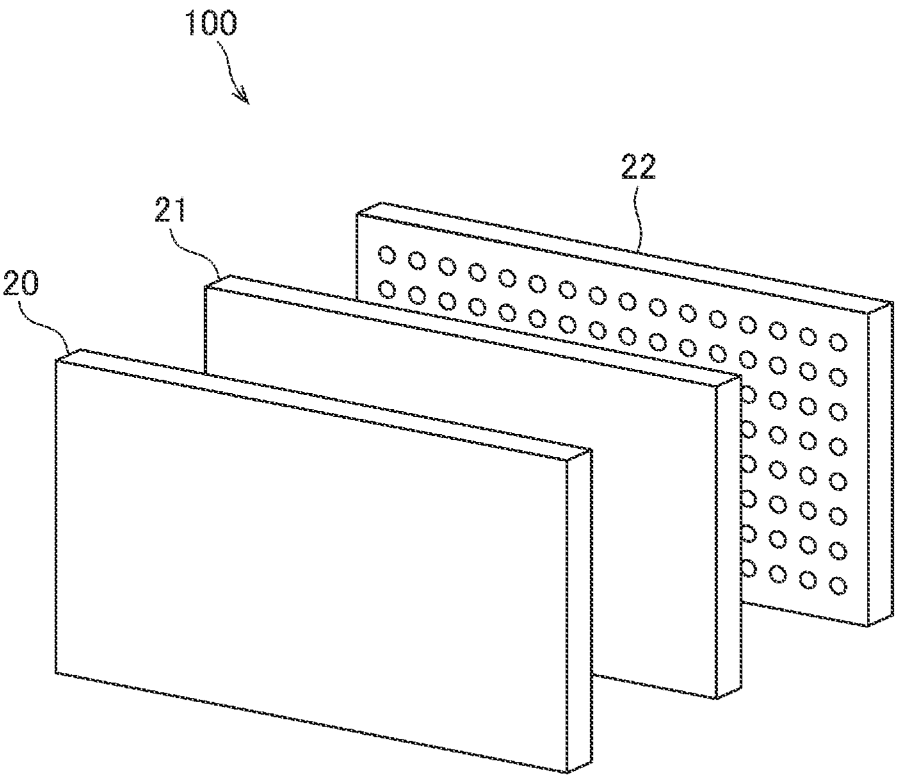
FIG. 1 is an exploded perspective diagram schematically illustrating an example of an overall configuration of a liquid crystal display device according to a first embodiment of the disclosure.

In the following, configurations of a liquid crystal display device according to each embodiment of the disclosure will be described with reference to the accompanying drawings. Further, in each of the drawings, the same or equivalent elements are denoted by the same reference numerals and signs, and descriptions thereof will not be repeated.

First Embodiment

Figure 2:
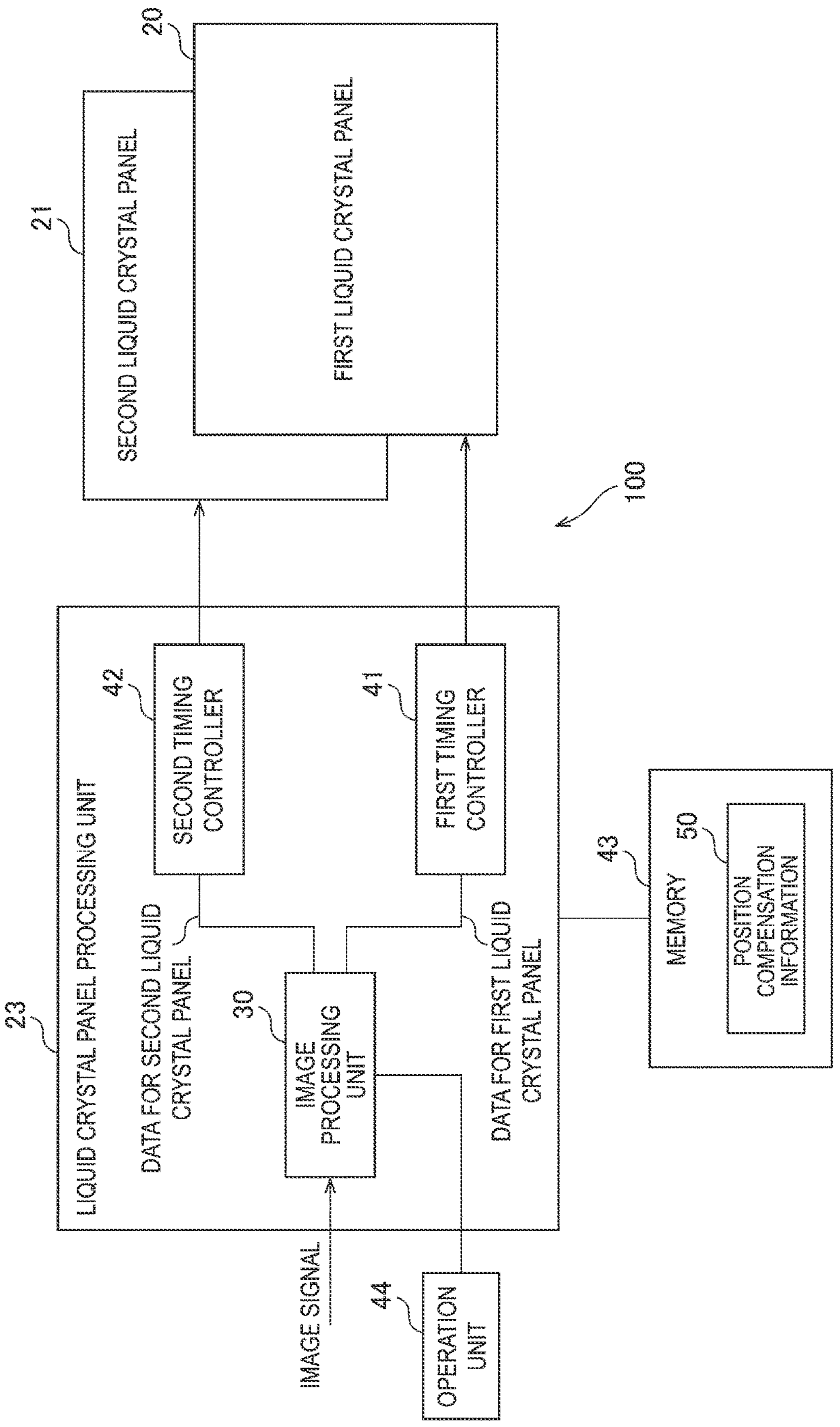
FIG. 2 is a block diagram illustrating an example of a configuration related to an image display process in the liquid crystal display device according to the first embodiment of the disclosure.

A configuration of a liquid crystal display device 100 (a display device) according to the present embodiment will be described below with reference to FIGS. 1 and 2. FIG. 1 is an exploded perspective diagram schematically illustrating an example of an overall configuration of the liquid crystal display device 100 according to a first embodiment of the disclosure. FIG. 2 is a block diagram illustrating an example of an overall configuration of the liquid crystal display device 100 illustrated in FIG. 1.

The liquid crystal display device 100 includes a first liquid crystal panel 20, a second liquid crystal panel 21, and a backlight 22, and the second liquid crystal panel 21 is disposed between the first liquid crystal panel 20 and the backlight 22 as illustrated in FIG. 1. Further, in the liquid crystal display device 100, the side of the first liquid crystal panel 20 on which the backlight 22 and the second liquid crystal panel 21 are provided may be referred to as a back face side, and the side opposite thereto may be referred to as a front face side.

The backlight 22 includes, for example, a light emitting diode (LED) as a light emitting unit.

The first liquid crystal panel 20 is a liquid crystal panel on which images are displayed based on color image signals. For example, the first liquid crystal panel 20 is a liquid crystal panel including three R, G, B sub-pixels in each pixel. On the other hand, the second liquid crystal panel 21 is configured to display black-and-white image signals in unit of pixels. Thus, the second liquid crystal panel 21 can adjust luminance in unit of pixels. Further, in the disclosure, an image is a signal indicating a plurality of images in time series.

The liquid crystal display device 100 can display images by controlling the transmittance at which the light emitted by the backlight 22 passes through the pixels in each of the first liquid crystal panel 20 and the second liquid crystal panel 21, in the liquid crystal display device 100. In other words, the liquid crystal display device 100 is configured to control individual LEDs provided in the backlight 22 and control drive of the first liquid crystal panel 20 and the second liquid crystal panel 21 in conjunction with the control of the LEDs.

Further, the resolution of the first liquid crystal panel 20 is greater than the resolution of the second liquid crystal panel 21. For example, the first liquid crystal panel 20 is assumed to have a resolution of 3840 in the number of horizontal pixels X 2160 in the number of vertical pixels, and the second liquid crystal panel 21 is assumed to have a resolution of 1920 in the number of horizontal pixels X 1080 in the number of vertical pixels.

Next, a configuration related to an image display process in the liquid crystal display device 100 will be described with reference to FIG. 2. FIG. 2 is a block diagram illustrating an example of a configuration related to the image display process in the liquid crystal display device 100 according to the first embodiment of the disclosure. The liquid crystal display device 100 includes a liquid crystal panel processing unit 23 that performs various signal processing so as to display an image on each of the first liquid crystal panel 20 and the second liquid crystal panel 21 based on an image signal input from the outside.

The liquid crystal panel processing unit 23 includes an image processing unit 30, a first timing controller 41, and a second timing controller 42 as illustrated in FIG. 2. The image processing unit 30 converts various image signals input from the outside into RGB digital signals. Then, the image processing unit performs image processing on the converted digital signal to generate data for the first liquid crystal panel and data for the second liquid crystal panel. The data for the first liquid crystal panel and the data for the second liquid crystal panel are output to the first liquid crystal panel 20 and the second liquid crystal panel 21 at appropriate timings for each of the first liquid crystal panel 20 and the second liquid crystal panel 21, through the first timing controller 41 and the second timing controller 42, respectively.

However, in a case in which a display panel is composed of a first liquid crystal panel 20 and a second liquid crystal panel 21, like the liquid crystal display device 100 according to the present embodiment, a relative positional relationship between the first liquid crystal panel 20 and the second liquid crystal panel 21 may have a shift when the first liquid crystal panel 20 and the second liquid crystal panel 21 are bonded during the manufacturing of the liquid crystal display device 100.

For this reason, the liquid crystal display device 100 is configured such that, when the relative positional relationship between the first liquid crystal panel 20 and the second liquid crystal panel 21 has a shift, the display position can be shifted so as to align the position of an image displayed on the second liquid crystal panel 21 with that of an image displayed on the first liquid crystal panel 20. However, when the display position of the image displayed on the second liquid crystal panel 21 is simply shifted, a marginal area 60 that is a display region portion of the second liquid crystal panel 21 in which there is no image data to be displayed will be displayed in black, and thus appropriate display will not be performed.

Thus, the liquid crystal display device 100 is configured to generate image data for which the image processing unit 30 expands a displayable area of an image to be displayed on the second liquid crystal panel 21. Further, a displayable area is a range of an image that can be displayed on the second liquid crystal panel 21 based on image data. Typically, a range in which an image can be displayed based on image data generated from an input image signal is a range corresponding to a display region of the second liquid crystal panel 21. However, in the liquid crystal display device 100 according to the present embodiment, image data is generated such that the displayable area is larger than the display area of the second liquid crystal panel 21.

Figure 3:
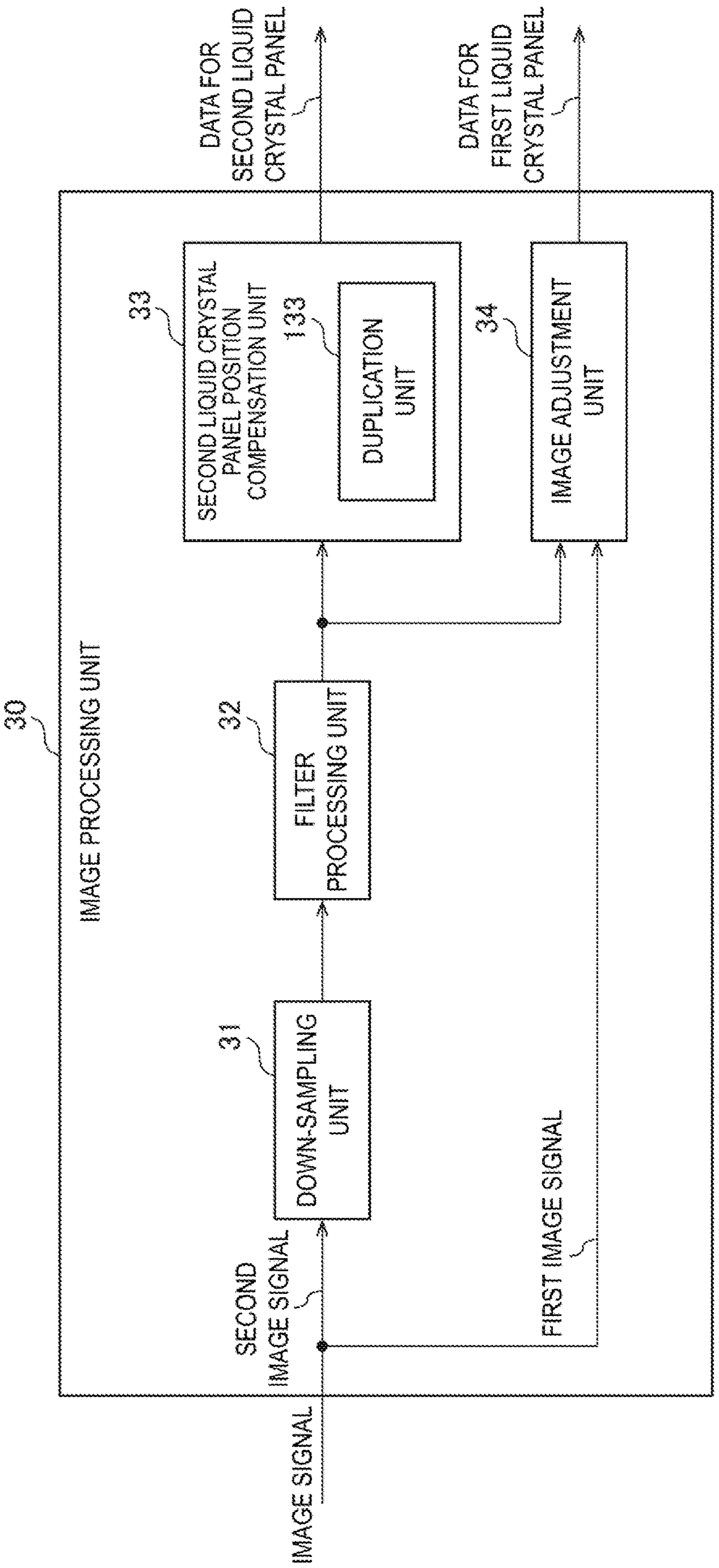
FIG. 3 is a block diagram illustrating an example of a configuration of an image processing unit included in a liquid crystal panel processing unit illustrated in FIG. 2.

Here, a detailed configuration of the image processing unit 30 will be described with reference to FIG. 3. FIG. 3 is a block diagram illustrating an example of a configuration of the image processing unit 30 included in the liquid crystal panel processing unit 23 illustrated in FIG. 2. FIG. 4 is a table showing an example of filter coefficients of a filter used by a filter processing unit 32 included in the image processing unit 30 illustrated in FIG. 3.

The image processing unit 30 includes a down-sampling unit 31, a filter processing unit 32, a second liquid crystal panel position compensation unit 33, and an image adjustment unit 34 as illustrated in FIG. 3. In the liquid crystal display device 100 according to the first embodiment, the image processing unit 30 is implemented by an application specific integrated circuit (ASIC) or a field-programmable gate array (FPGA).

An image signal input from the outside is divided into a first image signal of an image displayed on the first liquid crystal panel 20 and a second image signal of an image displayed on the second liquid crystal panel 21. Then, the first image signal is input to the image adjustment unit 34, and the second image signal is input to the down-sampling unit 31.

Here, the second liquid crystal panel 21 has a lower resolution than the resolution of the first liquid crystal panel 20. Thus, the image processing unit 30 generates image data having a reduced resolution as the image data to be displayed on the second liquid crystal panel 21. For example, if one pixel of the second liquid crystal panel 21 is assumed to correspond to four pixels of the first liquid crystal panel 20, image data is generated such that the one pixel of the second liquid crystal panel 21 obtains information of the pixel having the greatest luminance value among the four pixels of the first liquid crystal panel 20.

The filter processing unit 32 performs filtering on the image data generated by the down-sampling unit 31 to generate image data. For example, the filter processing unit 32 obtains a luminance value of a pixel of interest in the image data generated by the down-sampling unit 31 from luminance values of surrounding pixels adjacent to the pixel of interest. Specifically, using a filter coefficient shown in FIG. 4, the filter processing unit 32 obtains the luminance value of the pixel of interest using Expression (1) below. Further, in FIG. 4, 7×7 filter coefficients will be exemplified. In addition, "mask0" in Expression (1) indicates a filter coefficient.

[Math. 1]

$$\text{output}(x, y) = \sum_{mx=0}^{msize-1} \sum_{my=0}^{msize-1} \text{mask0}(mx, my) \times \text{input}(x + mx - msize/2,\ y + my - msize/2) \quad (1)$$

The image data generated by the filter processing unit 32 is output to the second liquid crystal panel position compensation unit 33 and the image adjustment unit 34.

The image adjustment unit 34 generates data for the first liquid crystal panel, which is image data to be displayed on the first liquid crystal panel 20, based on the image data input from the filter processing unit 32 and the first image signal. The image adjustment unit 34 refers to the image data input from the filter processing unit 32, adjusts a gray scale value of first image data such that a desired image is displayed on the liquid crystal display device 100 when the first liquid crystal panel 20 and the second liquid crystal panel 21 display the image, and generates data for the first liquid crystal panel. The image adjustment unit 34 outputs the generated data for the first liquid crystal panel to the first timing controller 41.

The second liquid crystal panel position compensation unit 33 shifts the position of the image to be displayed on the second liquid crystal panel 21 from the initial position based on position compensation information 50. Further, the initial position mentioned here is the original position at which the image is to be displayed based on the input image signal.

Note that the second liquid crystal panel position compensation unit 33 can acquire the position compensation information 50 as follows.

For example, before shipment from the factory, an amount of shift between the position of a pixel of the first liquid crystal panel 20 and the position of a pixel of the second liquid crystal panel 21 corresponding to the pixel, and the like are measured by using an inspection device, or the like, and the result of the measurement is stored in advance in a memory 43 included in the liquid crystal display device 100 as position compensation information 50. Further, although a configuration in which the memory 43 is provided outside the liquid crystal panel processing unit 23 is exemplified in FIG. 2, the memory 43 may be provided inside the liquid crystal panel processing unit 23. If the memory 43 is to be provided inside the liquid crystal panel processing unit 23, for example, it can be provided in the image processing unit 30.

Furthermore, the liquid crystal display device 100 is configured to receive the position compensation information 50 from a user via an operation unit 44. The position compensation information 50 input by using the operation unit 44 may be a value indicating the amount of shift described above, or may be information about the amount of movement of the image instructed through an operation of the operation unit 44. An example of the information about the amount of movement of the image instructed through an operation of the operation unit 44 includes information indicating that the image is moved to the right by one pixel by pressing the key indicating movement of the image to the right one time by using the operation unit 44, for example.

The second liquid crystal panel position compensation unit 33 adjusts the position of each pixel of the image to be displayed on the second liquid crystal panel 21, to be shifted based on the position compensation information 50 acquired from the memory 43 or the position compensation information 50 acquired from the operation unit 44. Furthermore, the second liquid crystal panel position compensation unit 33 includes a duplication unit 133 (an area expansion unit) as illustrated in FIG. 3. Then, the duplication unit 133 performs the following processes on the marginal area 60 created by shifting the position of the image to be displayed on the second liquid crystal panel 21 from the initial position.

Figure 5:
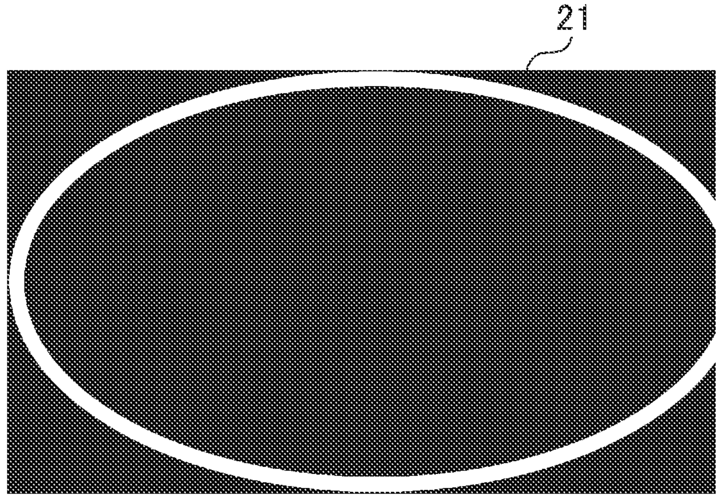
FIG. 5 is a diagram illustrating an example of an image displayed on a second liquid crystal panel included in the liquid crystal display device according to the first embodiment of the disclosure.
Figure 6:
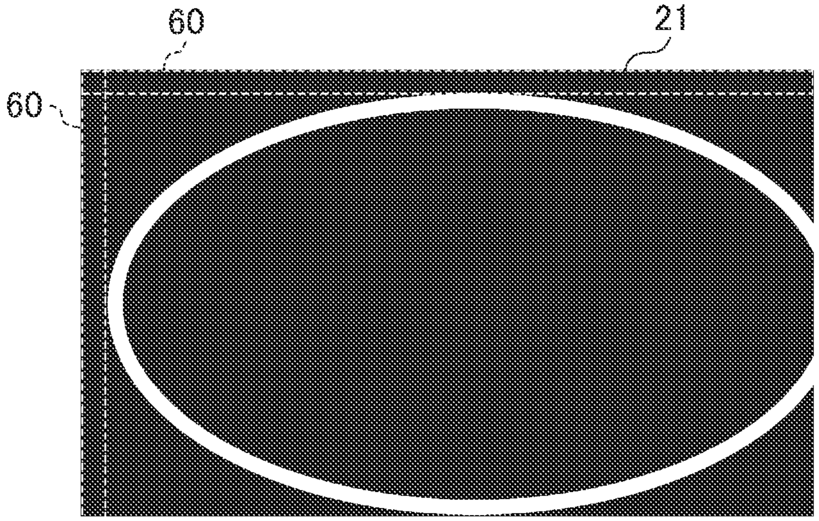
FIG. 6 is a diagram illustrating an example of an image moved from an initial position on the second liquid crystal panel illustrated in FIG. 5.

In other words, it is assumed that an elliptical image is displayed on the second liquid crystal panel 21 as illustrated in FIG. 5. It is assumed that the position of the image is an initial position, and the image is moved from the upper left corner to the lower right corner of the second liquid crystal panel 21 as illustrated in FIG. 6. At this time, the marginal area 60 is formed at the left portion and the upper portion of the second liquid crystal panel 21. FIG. 5 is a diagram illustrating an example of the image displayed on the second liquid crystal panel 21 included in the liquid crystal display device 100 according to the first embodiment of the disclosure. FIG. 6 is a diagram illustrating an example of the image moved from the initial position on the second liquid crystal panel 21 illustrated in FIG. 5.

Figure 7:
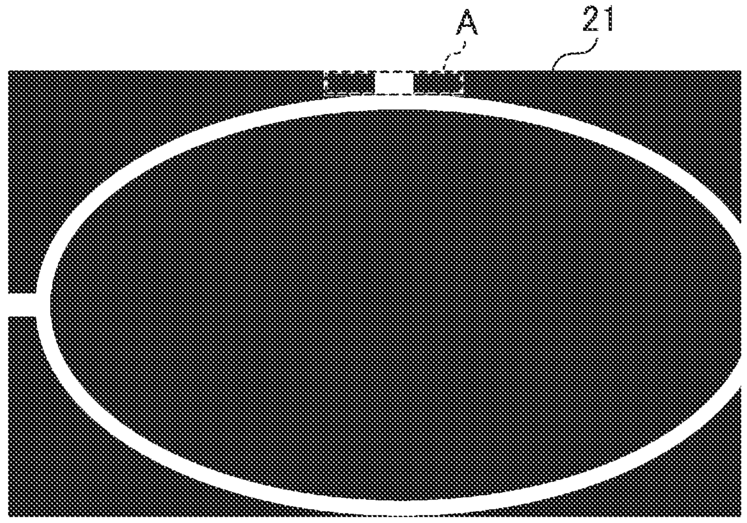
FIG. 7 is a diagram illustrating an example in which an image of the edge of the image is displayed in the marginal area of the image illustrated in FIG. 6.
Figure 8:
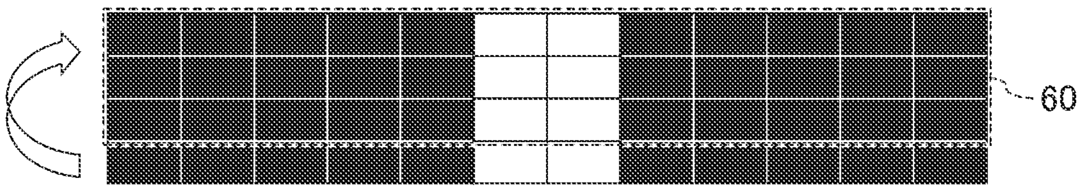
FIG. 8 is an enlarged view of a portion A of the image illustrated in FIG. 7.

The duplication unit 133 included in the second liquid crystal panel position compensation unit 33 generates image data such that an image obtained by duplicating the pixels on the edge of the image coming in contact with the marginal area 60 is displayed in the marginal area 60 as illustrated in FIGS. 7 and 8. More specifically, the duplication unit 133 sets the luminance of the pixels disposed in the marginal area 60 to be the same as the luminance of the pixels forming the column constituting the edge of the image coming in contact with the marginal area 60, as illustrated in FIG. 8. As a result, the same image as the edge of the image can be displayed in the marginal area 60, and the marginal area 60 can be prevented from being displayed in black as illustrated in FIGS. 7 and 8.

FIG. 7 is a diagram illustrating an example in which an image of the edge of the image is displayed in the marginal area 60 of the image illustrated in FIG. 6. FIG. 8 is an enlarged view of a portion A of the image illustrated in FIG. 7. One square in FIG. 8 represents one pixel.

Further, although the luminance of the pixels disposed in the marginal area 60 is set to the same as the luminance of the pixels constituting the edge of the image coming in contact with the marginal area 60 in the liquid crystal display device 100, they need not necessarily be the same. For example, the luminance of the pixels disposed in the marginal area 60 may have a value obtained from a predetermined function based on the luminance of the pixels constituting the edge of the image coming in contact with the marginal area 60 (a value associated with the luminance of the pixels constituting the edge of the image).

By setting the luminance of the pixels disposed in the marginal area 60 to be the same as the luminance of the pixels disposed at the edge of the image or to have a value associated with the luminance of the pixels disposed at the edge of the image in the liquid crystal display device 100 as above, the displayable area for the image on the second liquid crystal panel 21 can be expanded to the marginal area 60.

Second Embodiment

Figure 9:
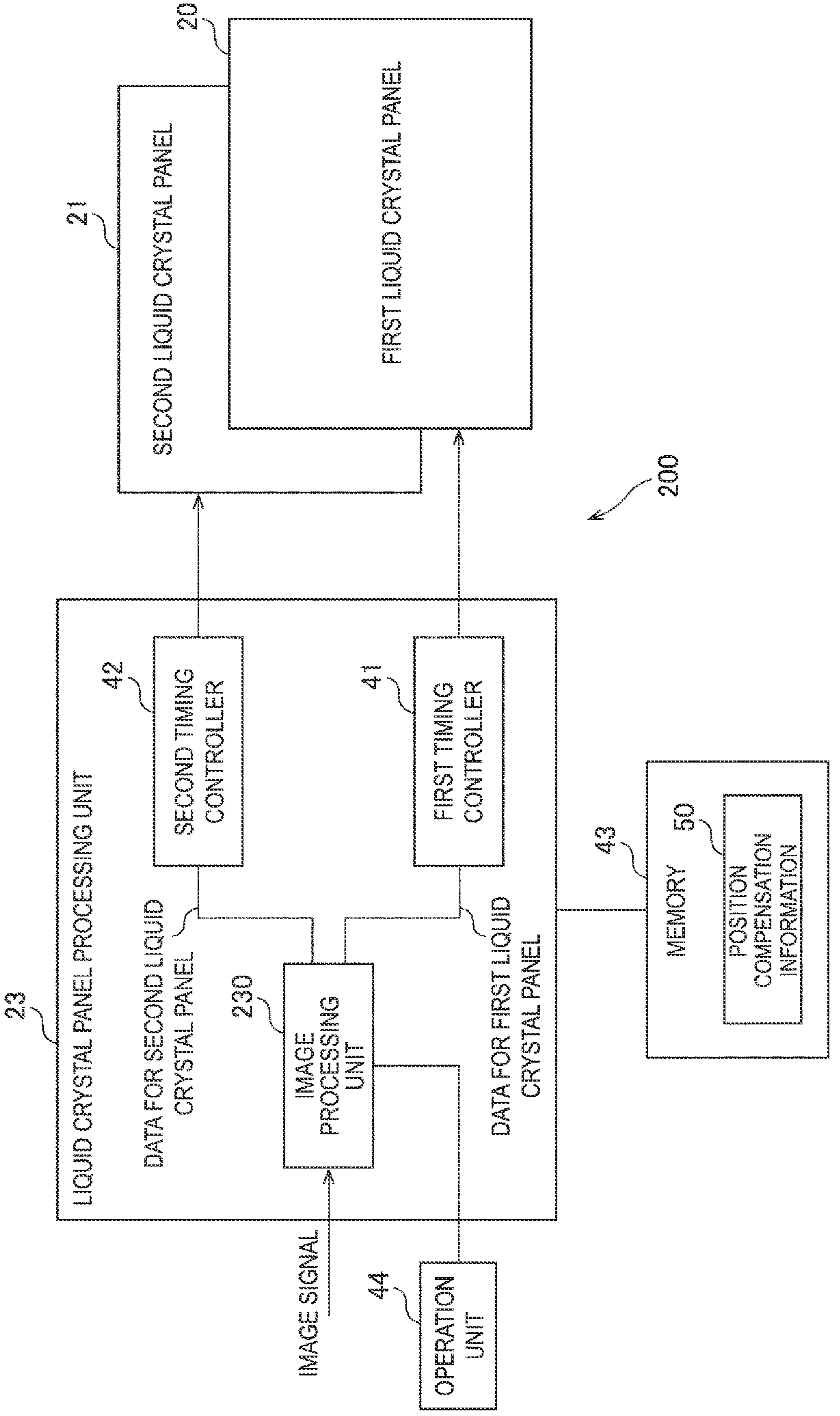
FIG. 9 is a block diagram illustrating an example of a configuration related to an image display process in a liquid crystal display device according to a second embodiment of the disclosure.
Figure 10:
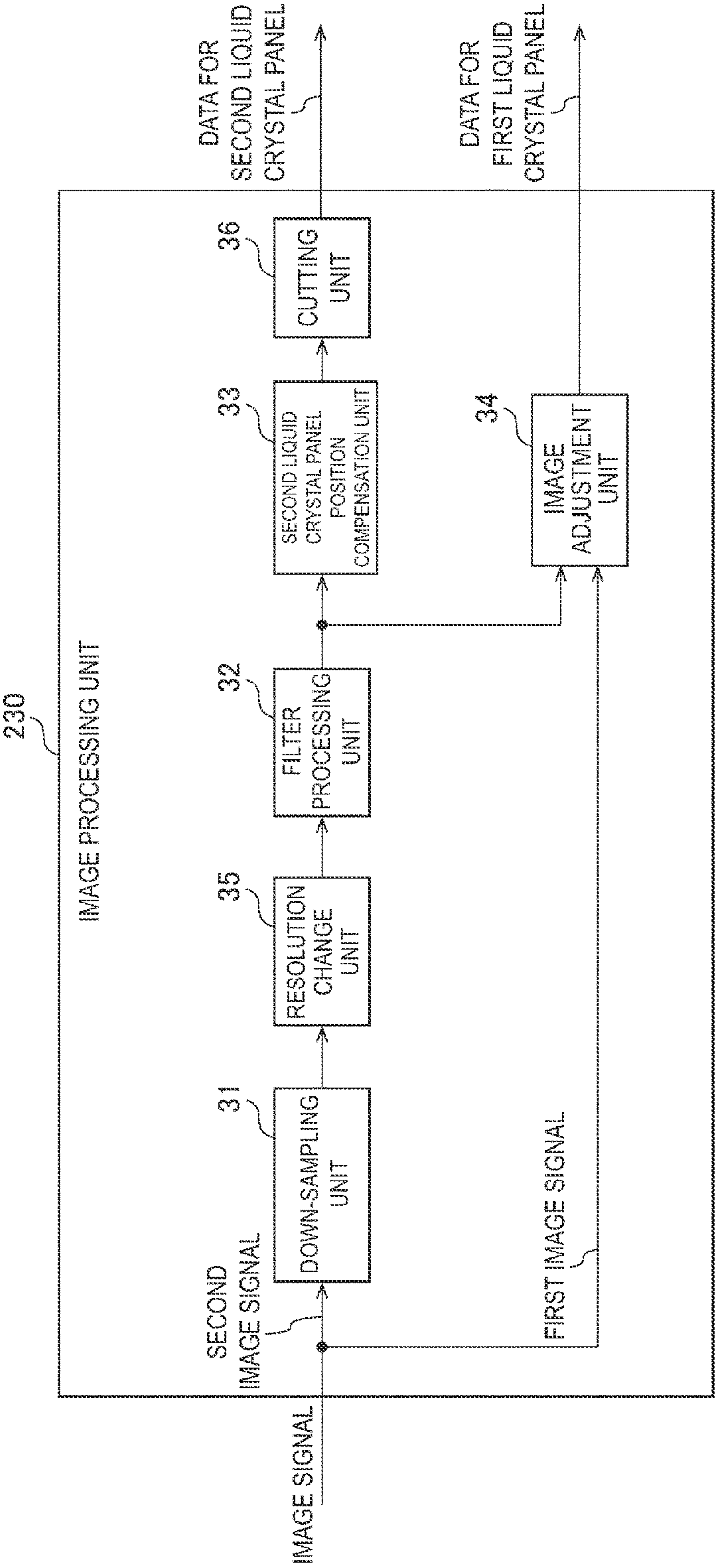
FIG. 10 is a block diagram illustrating an example of a configuration of an image processing unit included in the liquid crystal panel processing unit illustrated in FIG. 9.

Next, a configuration of a liquid crystal display device 200 according to a second embodiment will be described with reference to FIGS. 9 and 10. FIG. 9 is a block diagram illustrating an example of a configuration related to an image display process in the liquid crystal display device 200 according to the second embodiment of the disclosure. FIG. 10 is a block diagram illustrating an example of a configuration of an image processing unit 230 included in a liquid crystal panel processing unit 23 illustrated in FIG. 9.

The liquid crystal display device 200 according to the second embodiment differs from the liquid crystal display device 100 according to the first embodiment in that the image processing unit 230 is provided instead of the image processing unit 30.

In other words, the image processing unit 230 included in the liquid crystal display device 200 according to the second embodiment differs in that a resolution change unit 35 (an area expansion unit) and a cutting unit 36 are further included in the configuration of the image processing unit 30 of the liquid crystal display device 100 according to the first embodiment.

In addition, another difference is that, the second liquid crystal panel position compensation unit 33 included in the image processing unit 30 according to the first embodiment has the duplication unit 133, whereas the second liquid crystal panel position compensation unit 33 included in the image processing unit 230 according to the second embodiment does not include the duplication unit 133.

With respect to other points, the liquid crystal display device 100 according to the first embodiment and the liquid crystal display device 200 according to the second embodiment have the same configuration, and thus the same reference numerals are assigned to the same components, and detailed description thereof will be omitted.

The image processing unit 230 further includes the resolution change unit 35 and the cutting unit 36 in the configuration of the image processing unit 30 as illustrated in FIG. 10.

Here, when an image displayed on the second liquid crystal panel 21 based on an image signal input from the outside is set as a reference image, the resolution change unit 35 generates image data with a greater displayable resolution than the resolution of the reference image. In this way, the resolution change unit 35 can generate image data in which the displayable area of the reference image has been expanded.

Specifically, the resolution change unit 35 generates image data in which the displayable resolution becomes greater through the surroundings of the reference image based on the result obtained after performing filtering on each of a plurality of pixels composing the perimeter of the reference image as pixels of interest.

That is, it is assumed that the horizontal size of an image to be displayed on the second liquid crystal panel 21 is set as a size x, and the maximum range in which an image can be moved in the horizontal direction by using the second liquid crystal panel position compensation unit 33 is set as ±offset_max x. In addition, it is assumed that a vertical size of the image is set to a size y, and the maximum range in which the image can be moved in the vertical direction is set as ±offset_max y. At this time, with respect to a maximum dimension range of the image in which the second liquid crystal panel position compensation unit 33 can receive an input, the horizontal dimension is size x+2×offset_max x, and the vertical dimension is size y+2×offset_max y.

Figure 11:
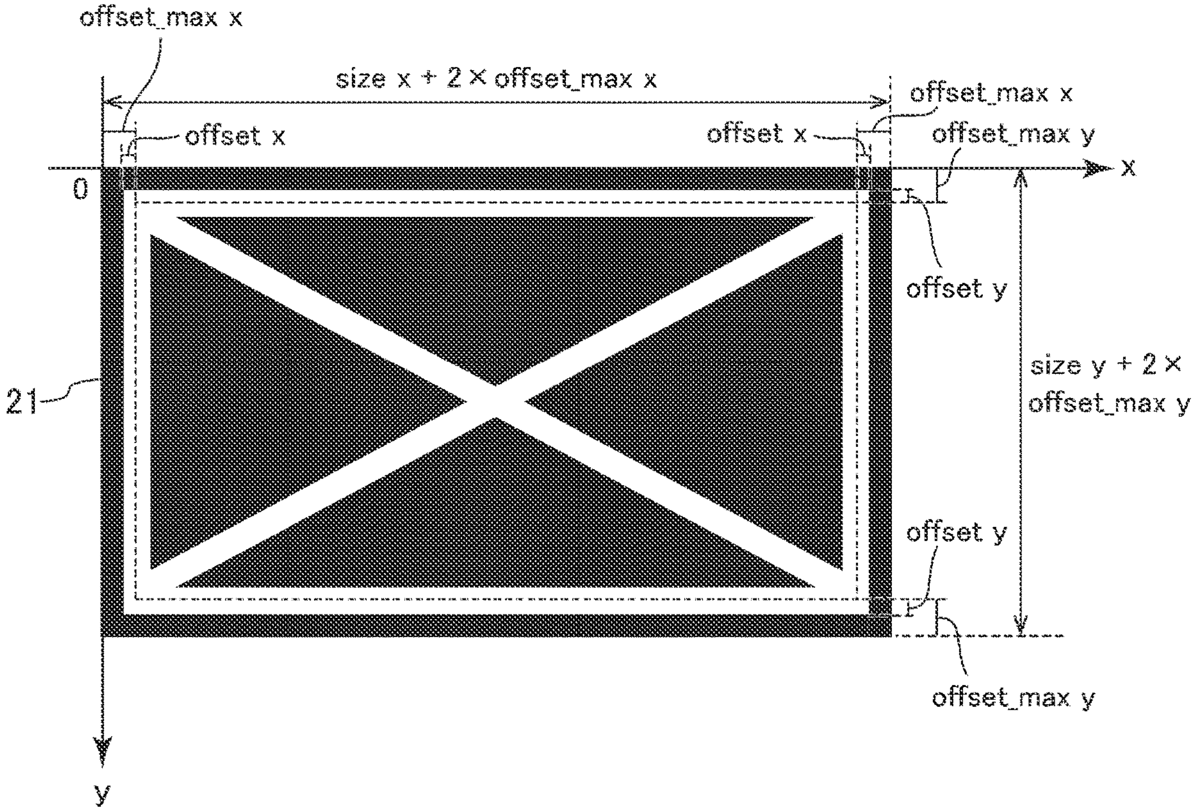
FIG. 11 is a diagram illustrating an example of an image that can be input to a second liquid crystal panel position compensation unit illustrated in FIG. 10.

Thus, the vertical and horizontal dimensions of the image expanded by the resolution change unit 35 is at least within the above-described maximum dimension range of the image in which the second liquid crystal panel position compensation unit 33 can receive an input as illustrated in FIG. 11. FIG. 11 is a diagram illustrating an example of an image that can be input to the second liquid crystal panel position compensation unit 33 illustrated in FIG. 10. In FIG. 11, offset x and offset y indicate the amounts of movement of the image moved by the second liquid crystal panel position compensation unit 33. Further, the upper left corner of the second liquid crystal panel 21 are set as the origin (0, 0), the horizontal axis is set as an x axis, and the vertical axis is set as a y axis as illustrated in FIG. 11.

The image data having the displayable resolution increased by the resolution change unit 35 is output to the filter processing unit 32. The filter processing unit 32 performs filtering on the input image data to generate image data. Then, the filter processing unit 32 inputs the generated image data to each of the second liquid crystal panel position compensation unit 33 and the image adjustment unit 34.

The image adjustment unit 34 generates data for the first liquid crystal panel based on the image data input from the filter processing unit 32 and the first image signal.

Meanwhile, the second liquid crystal panel position compensation unit 33 shifts the position of the image to be displayed on the second liquid crystal panel 21 from the initial position based on the acquired position compensation information 50. In addition, with respect to dimensions of the image input to the second liquid crystal panel position compensation unit 33, the horizontal dimension is size x+2×offset_max x, and the vertical dimension is size y+2×offset_max y as described above. Thus, the cutting unit 36 cuts the image data in the range being not displayed on the second liquid crystal panel 21 out of the image moved by the second liquid crystal panel position compensation unit 33, and thereby generates image data having a horizontal dimension of size x and a vertical dimension of size y. Then, the cutting unit 36 outputs the generated data for the second liquid crystal panel to the second timing controller 42.

Figure 12:
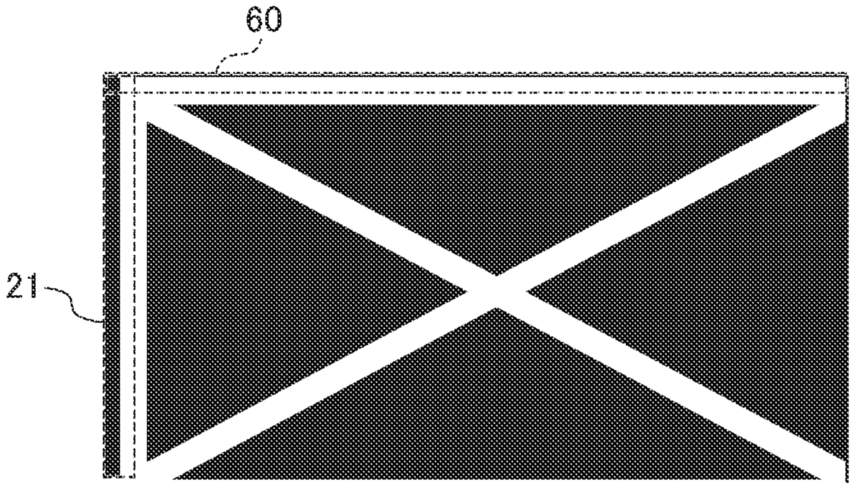
FIG. 12 is a diagram illustrating an example of an image displayed on a second liquid crystal panel included in the liquid crystal display device according to the second embodiment of the disclosure.

Because the image data having the displayable resolution increased by the resolution change unit 35 can be generated as described above, an image can also be displayed in the portion that would originally be the marginal area 60 of the image moved from the initial position by the second liquid crystal panel position compensation unit 33, as illustrated in FIG. 12. FIG. 12 is a diagram illustrating an example of an image displayed on the second liquid crystal panel 21 in the liquid crystal display device 200 according to the second embodiment of the disclosure. Further, in FIG. 12, a case in which the image has been moved from the upper left corner to the lower right corner of the second liquid crystal panel 21 is illustrated as an example.

First Modified Example

Figure 13:
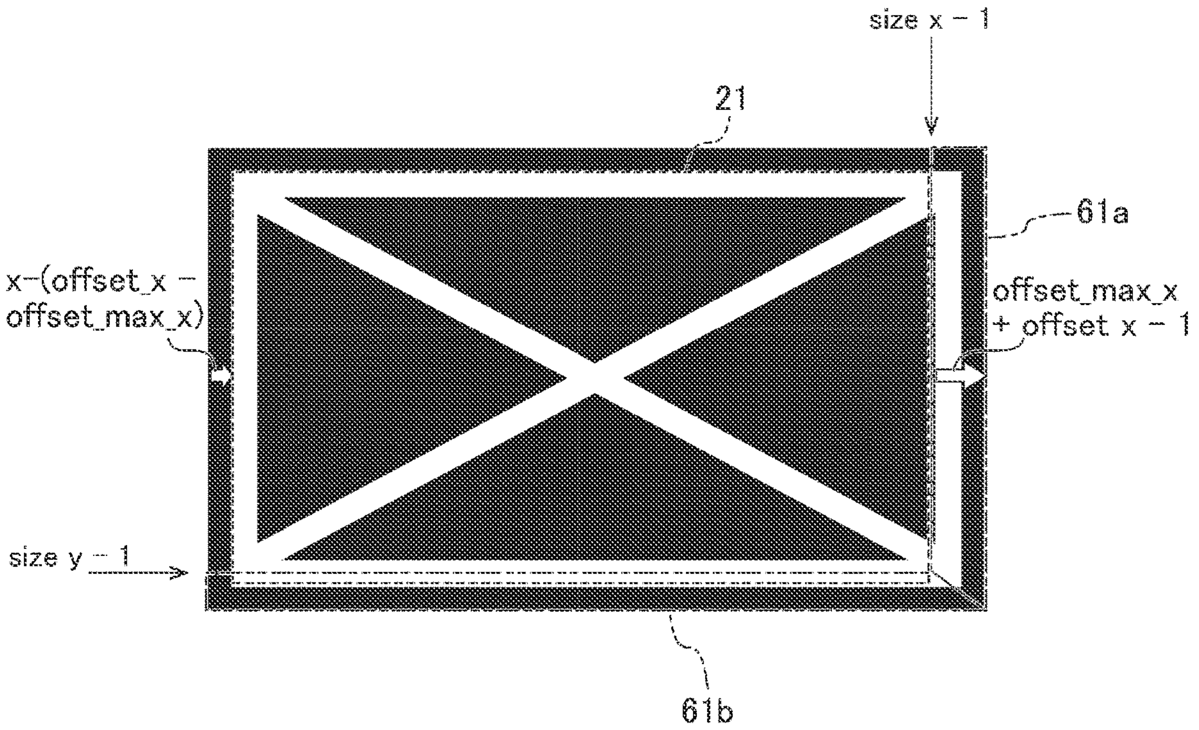
FIG. 13 is a diagram illustrating an example of a positional relationship between a range of an image displayable on a second liquid crystal panel and a range of an image that is actually displayed on the second liquid crystal panel included in the liquid crystal display device according to the second embodiment of the disclosure.

In a case in which an image is moved from the upper left corner to the lower right corner of the second liquid crystal panel 21 as illustrated in FIG. 12, for example, the images of a cut area 61*a* on the right portion and a cut area 61*b* at the lower portion illustrated in FIG. 13 are cut out by the cutting unit 36 and thus may not be displayed. If an image that is supposed to be displayed is not displayed in this manner, images cannot be appropriately displayed. Further, FIG. 13 is a diagram illustrating an example of a positional relationship between a range of an image displayable on the second liquid crystal panel 21 and a range of an image that is actually displayed on the second liquid crystal panel 21 in the liquid crystal display device 200 according to the second embodiment of the disclosure.

Therefore, in the liquid crystal display device 200 according to a first modified example of the second embodiment, the second liquid crystal panel position compensation unit 33 sets luminance values of each of a plurality of pixels composing the edge of the image coming in contact with the cut areas 61*a* and 61*b* (edge pixels) to a value based on a representative value of luminance values of a plurality of pixels aligned in the same row (on the x axis) or the same column (on the y axis) as those of the edge pixels in the cut areas 61*a* and 61*b*.

In particular, in the liquid crystal display device 200 according to the first modified example of the second embodiment, the second liquid crystal panel position compensation unit 33 sets the luminance value of each edge pixel coming in contact with the cut area 61*a* to the maximum value among the luminance values of the plurality of pixels aligned in the same row as that of each edge pixel in the cut area 61*a*. In addition, the second liquid crystal panel position compensation unit 33 sets the luminance value of each edge pixel coming in contact with the cut area 61*b* to the maximum value among the luminance values of the plurality of pixels aligned in the same column as that of each edge pixel in the cut area 61*b*.

In other words, in the liquid crystal display device 200 according to the first modified example of the second embodiment, the second liquid crystal panel position compensation unit 33 obtains the maximum value from among the luminance values of the plurality of pixels aligned in the x axis direction having the same y coordinate as each edge pixel in the cut area 61*a*, and the maximum value of the luminance values is set as the luminance value of each of the edge pixels composing the right end portion of the image.

In addition, the second liquid crystal panel position compensation unit 33 obtains the maximum value from among the luminance values of the plurality of pixels aligned in the y axis direction having the same x coordinate as each edge pixel in the cut area 61*b*, and the maximum value of the luminance values is set as the luminance value of each of the edge pixels composing the lower end portion of the image.

By setting the luminance value of each of the edge pixels of the image to the maximum value of the luminance values obtained above in this manner, the liquid crystal display device 200 according to the first modified example of the second embodiment can display the image properly.

Specifically, the second liquid crystal panel position compensation unit 33 obtains the luminance value of each of the edge pixels of the right end portion by using the following Expression (2) when the image is moved to the right (in the positive direction) on the x axis and the value of the x coordinate of each of the edge pixels disposed at the right end portion coming in contact with the cut area 61*a* in the image is set to x=size x−1 (see FIG. 13).

[Math. 2]

$$\text{output}(x,y)=\text{Max}(\text{input}(x-(\text{offset\_}x-\text{offset\_max\_}x)+ix),y-(\text{offset\_}y-\text{offset\_max\_}y)))0\leq ix\leq \text{offset\_max\_}x+\text{offset\_}x \quad (2)$$

Further, input (x, y) represents a luminance value of any coordinates (x, y) of the input image based on an input image signal. output (x, y) represents a luminance value of any coordinates (x, y) of the output image based on data for the second liquid crystal panel output to the second liquid crystal panel 21. In addition, a variable ix is a value in the range of 0 to a value of offset_max_x+offset_x.

On the other hand, the second liquid crystal panel position compensation unit 33 obtains the luminance value of each of the edge pixels disposed at the left end portion of the image coming in contact with the cut area by using the following Expression (3) when the image is moved to the left (in the negative direction) on the x axis and the cut area on the left side facing the cut area 61*a* is cut by the cutting unit 36.

[Math. 3]

$$\text{output}(x,y)=\text{Max}(\text{input}(x+ix,y-(\text{offset\_}y-\text{offset\_max\_}y)))0\leq ix\leq \text{offset\_max\_}x+\text{offset\_}x \quad (3)$$

In addition, the second liquid crystal panel position compensation unit 33 obtains the luminance value of the edge pixels disposed at the lower end portion coming in contact with the cut area 61*b* by using the following Expression (4) when the image is moved down (in the positive direction) on the y axis and the value of the y axis of each of the edge pixels disposed at the lower end portion coming in contact with the cut area 61*b* is set to y=size y−1 (see FIG. 13).

[Math. 4]

$$\text{output}(x,y)=\text{Max}(\text{input}(x-(\text{offset\_}x-\text{offset\_max\_}x),y-(\text{offset\_}y-\text{offset\_max\_}y)+iy))0\leq iy\leq \text{offset\_max\_}y+\text{offset\_}y \quad (4)$$

Further, a variable iy is a value in the range of 0 to a value of offset_max_y+offset_y.

On the other hand, the second liquid crystal panel position compensation unit 33 obtains the luminance value of the edge pixels disposed at the upper end portion of the image coming in contact with the cut area by using the following Expression (5) when the image is moved up (in the negative direction) on the y axis and the cut area on the upper side of the image facing the cut area 61*b* is cut by the cutting unit 36.

[Math. 5]

$$\text{output}(x,y)=\text{Max}(\text{input}(x-(\text{offset}_x-\text{offset\_max\_}x),y+iy))0\leq iy\leq \text{offset\_max\_}y+\text{offset\_}y \quad (5)$$

In the liquid crystal display device 200 according to the first modified example of the second embodiment, the second liquid crystal panel position compensation unit 33 is configured such that a value based on a representative value is set to a maximum value of luminance values of the plurality of pixels aligned in the same row direction or the same column direction as the edge pixels in the cut area. However, the value based on the representative value is not limited to the maximum value of the luminance values of the plurality of pixels described above. For example, the value based on the representative value may be the average value of the luminance values of the plurality of pixels aligned in the same row direction or the same column direction as each of the edge pixels in the cut area.

A configuration in which a value based on a representative value is set to the average value of a plurality of pixel values aligned in the x axis direction or the y axis direction in the cut area will be described below as a second modified example of the second embodiment.

Second Modified Example

Specifically, in the liquid crystal display device 200 according to the second modified example of the second embodiment, the second liquid crystal panel position compensation unit 33 obtains the pixel value of the right end portion coming in contact with the cut area 61*a* by using the following Expression (6) when an image is moved to the right (in the positive direction) on the x axis and the value of x for the right end portion is x=size x−1. In other words, with respect to values of variables ix from 0 to offset_max_x+offset_x−1, the average value of the pixel values of the cut area 61*a* in the x axis direction is obtained by dividing the sum of offset_max_x+offset_x pixel values by offset_max_x+offset_x.

[Math. 6]

$$\text{output}(x, y) = \frac{\sum_{ix=0}^{offset\_max\_x+offset\_x-1} \text{input}(x - (\text{offset\_x} - \text{offset\_max\_x}) + ix,\ y - (\text{offset\_y} - \text{offset\_max\_y}))}{\text{offset\_max\_x} + \text{offset\_x}} \tag{6}$$

On the other hand, the second liquid crystal panel position compensation unit 33 obtains the pixel values of the left end portion of the image coming in contact with the cut area cut by the cutting unit 36 by using the following Expression (7) when the image is moved to the left (in the negative direction) on the x axis and the cutting unit 36 cuts the cut area on the left side facing the cut area 61*a*.

[Math. 7]

$$\text{output}(x, y) = \frac{\sum_{ix=0}^{offset\_max\_x+offset\_x-1} \text{input}(x+ix,\ y - (\text{offset\_y} - \text{offset\_max\_y}))}{\text{offset\_max\_x} + \text{offset\_x}} \tag{7}$$

In addition, the second liquid crystal panel position compensation unit 33 obtains the pixel value of the lower end portion of the image cut by the cutting unit 36 by using the following Expression (8) when the image is moved down (in the positive direction) on the y axis and the value of y of the lower end portion coming in contact with the cut area 61*b* is set to y=size y−1. In other words, with respect to values of the variables ix from 0 to offset_max_y+offset_y−1, the average value of the pixel values of the cut area 61*b* in the y axis direction is obtained by dividing the sum of offset_max_y+offset_y pixel values by offset_max_y+offset_y.

[Math. 8]

$$\text{output}(x, y) = \frac{\sum_{iy=0}^{offset\_max\_y+offset\_y-1} \text{input}(x - (\text{offset\_x} - \text{offset\_max\_x}),\ y - (\text{offset\_y} - \text{offset\_max\_y}) + iy)}{\text{offset\_max\_y} + \text{offset\_y}} \tag{8}$$

On the other hand, the second liquid crystal panel position compensation unit 33 obtains the pixel values of the upper end portion of the image coming in contact with the cut area cut by the cutting unit 36 by using the following Expression (9) when the image is moved up (in the negative direction) on the y axis and the cutting unit 36 cuts the cut area on the upper side of the image facing the cut area 61*b*.

[Math. 9]

$$\text{output}(x, y) = \frac{\sum_{iy=0}^{offset\_max\_y+offset\_y-1} \text{input}(x - (\text{offset\_x} - \text{offset\_max\_x}),\ y+iy)}{\text{offset\_max\_y} + \text{offset\_y}} \tag{9}$$

In the liquid crystal display device 200 according to the first modified example and the second modified example of the second embodiment described above, a value based on a representative value is set to the maximum value of the luminance values of the plurality of pixels aligned in the same row direction or in the same column direction as each of the edge pixels in the cut area, or the average value of the luminance values of the plurality of pixels. However, the value based on the representative value is not limited to be the maximum value or the average value, and may be, for example, the median of the luminance values of the plurality of pixels.

While there have been described what are at present considered to be certain embodiments of the application, it will be understood that various modifications may be made thereto, and it is intended that the appended claim cover all such modifications as fall within the true spirit and scope of the application.

The invention claimed is:

1. A display device comprising:

a first liquid crystal panel;

a second liquid crystal panel disposed on a back face side of the first liquid crystal panel;

a position compensation unit configured to compensate for a display position of an image on the second liquid crystal panel based on position compensation information indicating a relative positional relationship between the first liquid crystal panel and the second liquid crystal panel;

an area expansion unit configured to expand a first displayable area of the image before the display position is compensated for, or a second displayable area of the image after the display position is compensated for, by the position compensation unit; and a cutting unit configured to cut an area not displayed on the second liquid crystal panel from the image expanded by the area expansion unit, wherein the area expansion unit expands the first displayable area of the image based on a result of performing a filtering on each of a plurality of pixels composing a perimeter of the image as a pixel of interest.

2. The display device according to claim 1, wherein the area expansion unit expands the second displayable area of the image by setting luminance of pixels disposed in a marginal area in which the image is not displayed to have a value related to luminance of pixels forming a column constituting an edge of the image coming in contact with the marginal area.

3. The display device according to claim 1, further comprising: a luminance value change unit configured to change a luminance value of each of a plurality of edge pixels composing an edge of the image coming in contact with a cut area cut by the cutting unit to a value based on a representative value of luminance values of a plurality of pixels aligned in the same row or the same column as each of the plurality of edge pixels in the cut area.

4. The display device according to claim 3, wherein the value based on the representative value of the luminance values of the plurality of pixels is a maximum value of the luminance values of the plurality of pixels aligned in the same row or the same column as each of the plurality of edge pixels in the cut area.

5. The display device according to claim 3, wherein the value based on the representative value of the luminance values of the plurality of pixels is an average value of the luminance values of the plurality of pixels aligned in the same row or the same column as the plurality of edge pixels in the cut area.

6. The display device according to claim 1, further comprising: an input operation unit configured to input the position compensation information.

7. A control method of a display device including a first liquid crystal panel and a second liquid crystal panel disposed on a back face side of the first liquid crystal panel, the control method comprising:

compensating for a display position of an image on the second liquid crystal panel based on position compensation information indicating a relative positional relationship between the first liquid crystal panel and the second liquid crystal panel;

expanding a first displayable area of the image before the display position is compensated for, or a second displayable area of the image after the display position is compensated for, in the compensating for the display position of the image; and cutting an area not displayed on the second liquid crystal panel from the image expanded in the expanding, wherein expanding the first displayable area of the image comprises expanding the first displayable area of the image based on a result of performing a filtering on each of a plurality of pixels composing a perimeter of the image as a pixel of interest.

* * * * *